Sept. 20, 1932.    J. F. GULYBAN    1,878,496
WATER CIRCULATING SYSTEM FOR AUTOMOBILES
Filed Aug. 6, 1928
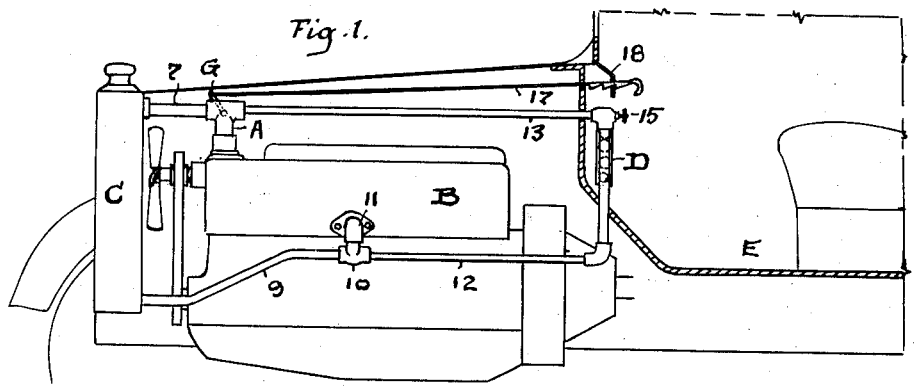
Fig. 1.
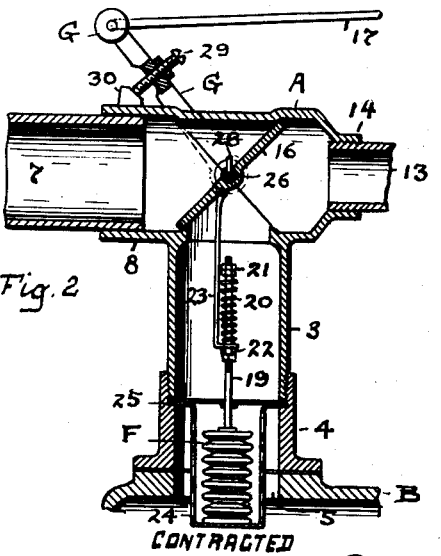
Fig. 2. CONTRACTED
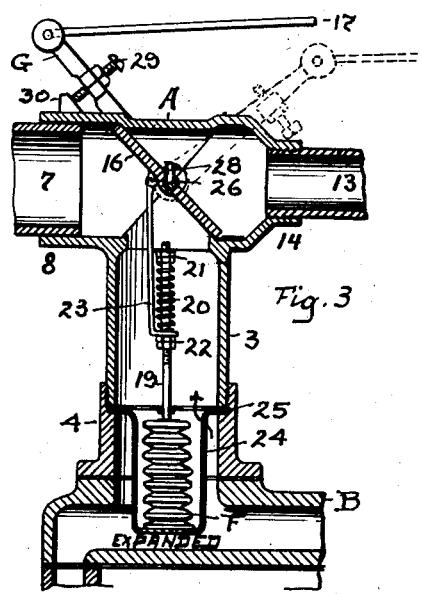
Fig. 3. EXPANDED
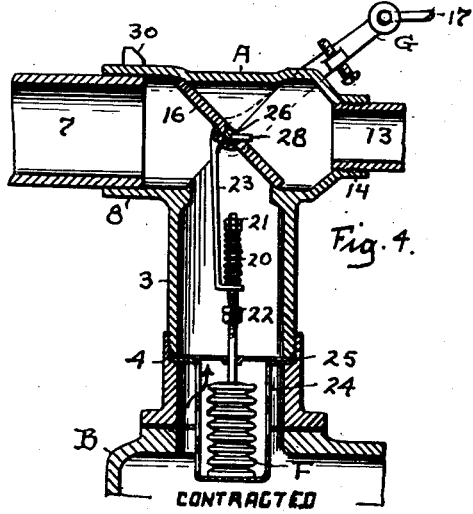
Fig. 4. CONTRACTED
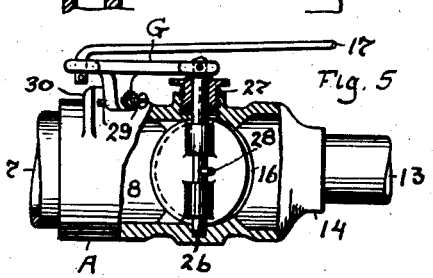
Fig. 5.
Inventor
J. F. GULYBAN.
By
Fisher Musser Furrow
Attorney Patented Sept. 20, 1932

1,878,496

UNITED STATES PATENT OFFICE

JOHN F. GULYBAN, OF BEDFORD, OHIO, ASSIGNOR, BY MESNE ASSIGNMENTS, TO TROPIC AIRE, INCORPORATED, OF MINNEAPOLIS, MINNESOTA, A CORPORATION OF DELAWARE

WATER CIRCULATING SYSTEM FOR AUTOMOBILES

Application filed August 6, 1928. Serial No. 297,898.

My invention relates to an improvement in a water circulating system for automobile engines, and my object in general is to provide a valve fitting which may be readily affixed to automobile engines in general use, whereby the water in the engine jacket may be caused to circulate either through the cooling radiator at the front of the vehicle or through a suitable heat radiator located within the body of the car. A further object is to provide a thermostatic device adapted to regulate the flow of water through the engine and cooling radiator, either to diminish the flow or to stop the circulation temporarily when the temperature of the water in the engine is too cool for efficient operation of the engine. As arranged, the device may also be manipulated and controlled manually to circulate the water through either the cooling radiator or the heat radiator, or to divide and divert the flow of water to said radiators jointly, all without rupture or breakage of the thermostatic appliance with which the operating parts are connected. As constructed the operating parts are also so arranged that the flow of water may be positively directed through the cooling radiator should the thermostatic device become inoperative, thereby assuring circulation of the water for cooling effects as common in all water cooled automobile engines. The fittings and coupling parts are also particularly designed to facilitate easy assembly and separation thereof and to permit convenient attachment of the thermostat unit to the engine.

In the accompanying drawing, Fig. 1 is a side elevation of an automobile engine and associated parts embodying my improvement. Fig. 2 is a sectional view, on a larger scale, of the attachment itself, with the operating parts in one position of use as in circulating hot water from the engine to the heat radiator. Fig. 3 is a sectional view of the attachment showing the operating parts as activated by the thermostat to circulate the water through the cooling radiator, and Fig. 4 is a similar view showing a locked position of the operating parts to maintain a constant circulation of water through the cooling radiator. Fig. 5 is a top view and horizontal section of the attachment.

As exemplified herein the invention comprises a hollow fitting or coupling member A having a tubular intake branch 3 which is adapted to be screwed into a flanged base or collar 4 connected with the water jacket outlet 5 of an automobile engine, for example, a water cooled internal combustion engine, B. Member A is of T shape, and a tube 7 of rubber or metal is adapted to connect one lateral branch 8 thereof with the upper end of the water cooling radiator C in front of the engine. The discharge end of radiator C is connected by a tube or pipe 9 with a T coupling 10 at the intake 11 for the water jacket of the engine, and the water may be induced to circulate through such parts by indraft at the engine or by a pump. Coupling 10 is also connected by a pipe 12 with a heat radiator D of any suitable character or kind placed at any desired point within the car or vehicle body E, and which heat radiator is further connected by a pipe 13 to the reduced branch 14 of attachment member A. An angle valve 15 is employed at heat radiator D to regulate the flow of the water through this auxiliary circulating line, or to cut it off entirely when no circulation of hot water to radiator D is desired.

The T head of member A contains a rotatable damper or valve 16 adapted to divert the water from outlet 5 to either branch 8 or 14, dependent upon the angular setting of the valve, all as controlled by an expansible thermostat unit F and a hand lever G. The lever has a handle connection or rod 17 extending to the dash of the car, where the operator may pull or push it and lock it in position to a bracket or other part 18. Expansible unit F has a vertical stem 19 carrying a coiled compression spring 20 and nuts 21 and 22 to permit a yielding connection to be made with valve 16 by means of a link 23. Expansible unit F may be of the bellows type, or any other suitable thermostatic device may be used in the outlet passage to operate valve 16, but as shown the unit is supported within a perforated cage 24 having an annular flange 25 at its upper end which is adapted to be clamped rigidly within outlet part 4 by branch 3 when member A is attached to said part 4.

Valve 16 is rotatably supported upon a cross shaft 26 extending through a screw-threaded nut and bushing 27 in one side of member A, see Fig. 5, and a short pin or lug 28 extends upwardly from shaft 26 centrally opposite the upper flat face of valve 16 to limit independent rotation of said valve relatively to said shaft. Pin 28 operates at other times to rotate said valve by means of said shaft. Operating lever G is fixed to the outer end of shaft 26, and an adjustable set screw 29 at the inner side of lever G is adapted to engage a stop lug 30 on member A to limit the movement of lever G in one direction. Thus lever G may be placed in a stationary position with set screw 29 in contact with lug 30, and then valve 16 may be oscillated within limits on cross shaft 26 by the thermostat unit, as indicated in full lines, Figs. 2 and 3. That is, in this position of the lever valve 16 may be turned on the shaft to either close the front branch 8 or the rear branch 14 of member A alternately, the first position of the valve being effected by the construction of thermostat unit F as occurs when there is a drop of about five degrees in temperature of the water, and the second position being brought about when the temperature of the water rises in that degree, or within the limits of any differential which may be adopted or found desirable for any particular make of engine. Such thermostatic control of the circulation of the water is automatic, the water being diverted through the cooling radiator when it becomes too hot, and then through the heat radiator D when cooled about five degrees. It should be understood that the water circulating through the water jacket is always hot when the engine is running, and that the water may still be used for heating the car notwithstanding the slight drop in temperature to effect a diversion of flow to heat radiator D.

If the water becomes too hot for effective use in the engine while the water is circulating through heat radiator D the thermostat unit will expand and divert the flow to the cooling radiator. Also whenever radiator D is cut off by closing angle valve 15 and the water becomes too hot for efficient use in the engine, the collapsible unit F will expand and open the passage leading to the cooling radiator. Automatic control of valve 16 may be utilized to maintain substantially uniform water temperatures within the engine, but there are times when continuous instead of intermittent circulation of the water through the cooling radiator is found desirable. Lever G may then be used to set the parts for continuous circulation of water through the cooling radiator. Thus by drawing rod 17 forward lever G will be turned to the inclined position shown in Fig. 4, thereby turning shaft 26 and its pin 28 in the same direction until valve 16 closes the passage to branch 14 and pipe 13. The valve may be fixed in that position by locking the operating rod 17 in any suitable way at the dash, for example, by hooking it to bracket 18. Assuming that the parts are so locked, spring 20 on stem 19 will be compressed if thermostat unit F contracts or happens to be contracted at that time, and rupture of the unit or breakage of the connection is thereby prevented. Furthermore, should the water become too hot in the engine while valve 16 is cutting off the cooling radiator, the unit F should be disrupted or fail to expand, the spring 20 will yield and permit valve 16 to open branch 8 leading to the cooling radiator, especially when angle valve 15 is closed and pressure is being built up within the water jacket.

What I claim, is:

1. A cooling and heating system for an automobile, including an engine, a radiator and heater in joint water circulating connection with said engine, a three-way valve fitting connecting the radiator, the heater, and the engine, a valve within said fitting, and heat actuated automatic means contained within the three-way valve fitting and controlling said valve.

2. In a cooling and heating system for an automobile, an internal combustion engine, a radiator and heater in water circulating connection with said engine, including a three-way valve fitting, a valve within said fitting controlling the direction of flow of the heated water, and thermostatic means contained within the three-way valve fitting for actuating said valve.

3. In a cooling and heating system for an automobile, operated by an internal combustion engine, a radiator and heater having water circulating connections with the engine, a three-way valve connecting said heater, radiator and engine, means for automatically shifting said valve, and means for manually shifting said valve, said automatically valve shifting means being operable under different adjustments derived from the manually shifting means.

4. In a cooling and heating system for automobiles as described, a three-way valve fitting, a valve rotatably confined within said fitting, a thermostatic device attached to said fitting and contained within the three-way valve fitting, and means connecting said heat actuated means and said valve.

5. In a cooling and heating system for automobiles as described, a T-shaped valve fitting, a damper rotatably supported in said fitting, means for controlling said damper manually, a thermostat in said fitting, a perforated support for said thermostat connected to said fitting, and means yieldable in one direction connecting said damper to said thermostat.

6. An arrangement as described in claim 5, including a link attached to the damper, a screw-threaded stem attached to the thermostat and slidably connected to said link, adjustable means and a spring for limiting the relative movement between the stem and link.

In testimony whereof I affix my signature.

JOHN F. GULYBAN.